Feb. 12, 1946. E. V. SYRCHER ET AL 2,394,820
SCALE
Filed Oct. 23, 1942 2 Sheets-Sheet 1

INVENTORS
EDWARD VICTOR SYRCHER, GEORGE BRUCE McNAIR
& WALTER WILBURN CRUMP
BY Alton and Griswold
ATTORNEYS Feb. 12, 1946. E. V. SYRCHER ET AL 2,394,820
SCALE
Filed Oct. 23, 1942 2 Sheets-Sheet 2
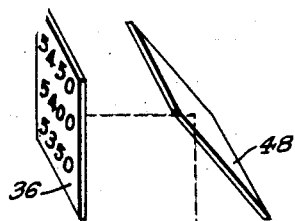
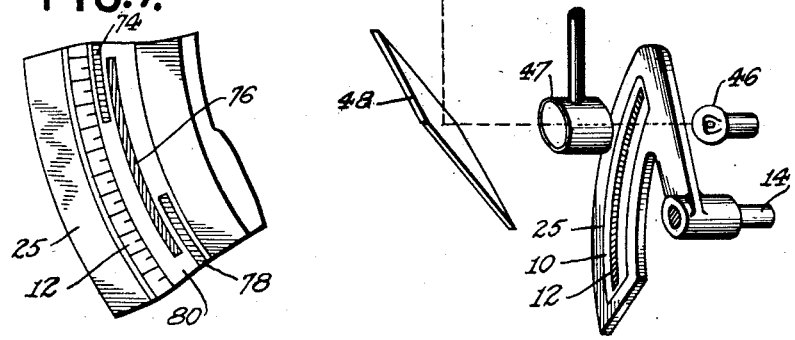
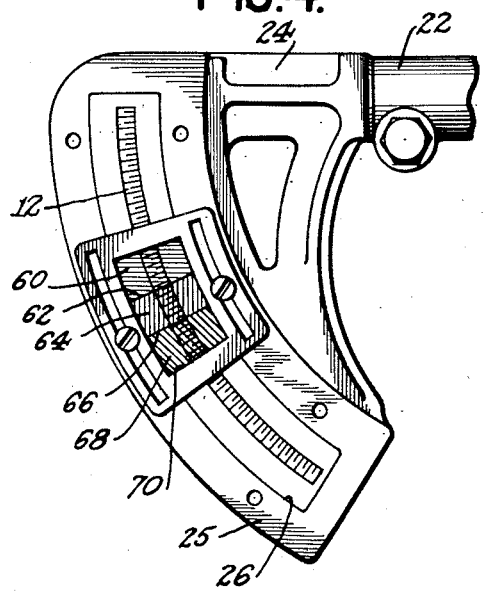
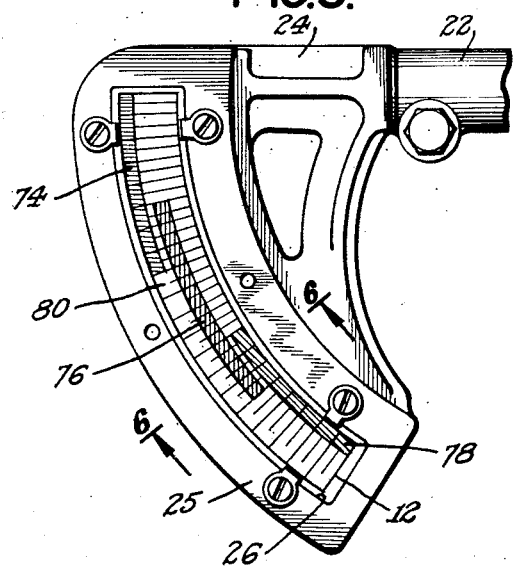
INVENTORS
EDWARD VICTOR SYRCHER, GEORGE BRUCE McNAIR
& WALTER WILBURN CRUMP
BY Arton and Griswold
ATTORNEYS Patented Feb. 12, 1946

2,394,820

UNITED STATES PATENT OFFICE 2,394,820

SCALE

Edward Victor Syrcher and George Bruce McNair, Chicago, Ill., and Walter Wilburn Crump, South Bend, Ind., assignors to The Howe Scale Company, Rutland, Vt., a corporation of Vermont Application October 23, 1942, Serial No. 463,018

9 Claims. (Cl. 88—1)

This invention relates to weighing scales of the kind in which the image of the weight indication on a transparent chart or the equivalent is thrown upon a screen and more particularly to a chart having illuminated color weight indications to facilitate and expedite the weighing operation, although not so limited.

One object of the present invention is a mask or a plurality of masks for such charts by which predetermined and specific weight indications may be quickly selected by the illiterate without chance of error.

Another object of the invention is the provision of masks for such charts by which tolerances over and under a specified weight may be clearly delineated.

An object of the invention is also to provide illuminated colored weight indication on a transparent chart.

It is also an object of the invention to obliterate weight indications on such a transparent chart except those of a specified weight and the tolerance over and/or under such weight.

Yet another object of the invention is to afford an indication of the point at which representations of weight are to be observed.

A further object of the invention is an indication of the point at which the tolerance ceases and yet one which renders the areas of the weight indication before and beyond the permissive tolerance visible in the interest of speed and accuracy of weighing.

Still another object of the invention is to provide indicating devices of the character described which may be adjustably mounted on a chart to permit changes in the setting as well as the use of a plurality of indicating devices where a scale is to be used in weighing different objects.

The invention also seeks to provide, in tolerance weighing, a chart in which an appreciable area of the surface is visible but only the weight representing the tolerance is apparent in the normal color, for instance white, of the chart.

It is further sought by the invention to provide a scale in which a predetermined color indicates the approach to a specified weight and a different color indicates when that specified weight has been exceeded.

Again, an object of the invention is to provide a scale which may be used for the weighing of different articles each of which has a different weigh and/or different tolerances. To this end, a plurality of masks may be adjustably mounted on a single chart.

It is also an object of the invention to provide indications of the character described for use with a scale used in batch weighing. To this end, a plurality of indications may be provided on the chart which are represented by zones of the same or different colors, the respective zones representing the required weights of the respective batches. In such a situation, it is frequently found that the zones to be covered overlap in weight indication.

The invention further contemplates the use of photographic colored film as a combined color screen and chart as well as transparent or translucent color screens.

It is also an object of the invention to provide weight indicating devices for transparent charts which, while capable of adjustment by qualified persons, are inaccessible for manipulation by incompetent or dishonest operators.

The invention also seeks weight indications which are practical from the standpoint of ease and convenience of manufacture and application and accuracy of adjustment.

These and other objects of the invention and the means for their attainment will be more apparent from the following detailed description, taken in connection with the accompanying drawings illustrating various embodiments by which the invention may be realized and in which:

Figure 3 is a somewhat diagrammatic perspective view showing the instrumentalities by which illuminated and colored weight indications are produced according to Figure 2;

Figure 4 is a view showing another application of the chart of Figure 1;

Figure 5 is a view showing another application of the invention;

Figure 6 is a transverse sectional view taken on the plane 6—6 of Figure 5; and

Figure 7 is a fragmentary view showing a modification of the chart of Figure 5.

Figure 1:
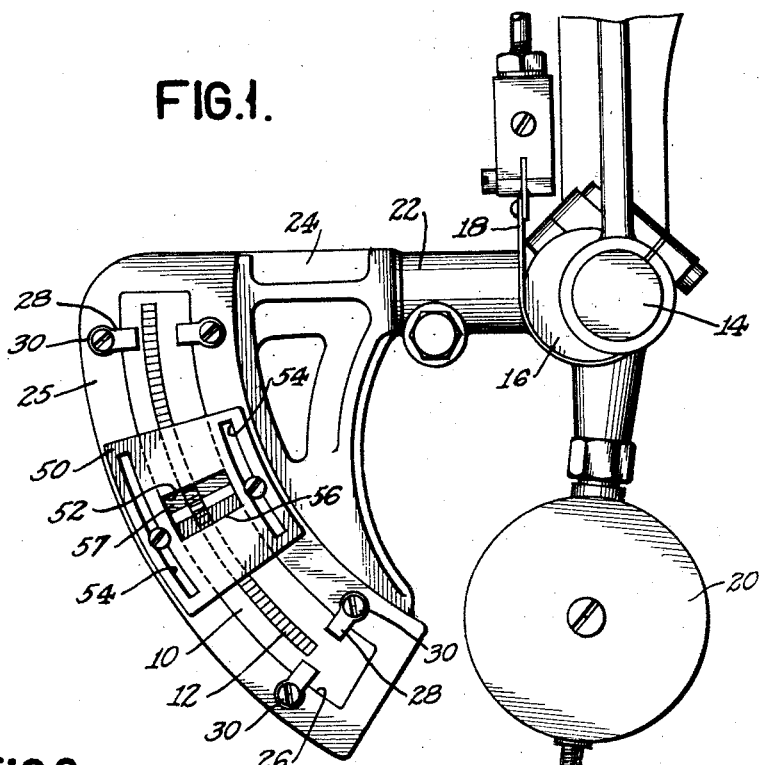
Figure 1 is a view showing a chart of this invention movable in proportion to the load on the weighing scales.

Referring first to Figure 1, there is shown an indicating chart of the kind disclosed broadly in Letters Patent of the United States No. 1,357,731 dated November 2, 1920. Such chart conveniently has relatively light transmitting portions and relatively opaque portions arranged in definite patterns bearing a direct relation to loads which the scale is capable of weighing. Thus the background 10 may be transparent while the graduations and numerals 12 may be opaque or vice versa.

Prior art adjustable and colored masks have been provided on the periphery of a scale dial, but these had to be accessible for adjustment between different positions and therefore were susceptible of manipulation by incompetent or dishonest operators. They were, in every instance, opaque.

According to this invention, the color screens are on the interior and adjustments can only be made by removing the exterior housing necessitating the use of tools.

In the drawings only so much of the scale mechanism is depicted as is necessary to illustrate the application of the invention thereto. A shaft 14 in Figure 1 carries a cam 16 connected by a flexible tape 18 to the steelyard rod (not shown) of the scale whereby for each motion of the beam a corresponding motion of the cam and consequently of the shaft is had. As in scales of this character, the chart carries a counterweight, not shown, and a pendulum 20. Extending outwardly in a generally horizontal direction (as viewed and when no load is on the scale) from the shaft is an arm 22 on which is mounted the end of a bracket 24 having a downwardly extending frame portion 25 shaped as a quadrant and carrying a transparent chart 10, 12. In the illustrated embodiment, the quadrant is provided with an arcuate opening 26 in which the chart is carried and held in position by readily releasable devices indicated herein as fingers 28 removably held by screws 30 to the frame and overlying the transparent chart. The graduations and indicia are inscribed upon an arc concentric with the axis of the shaft 14.

Figure 2:
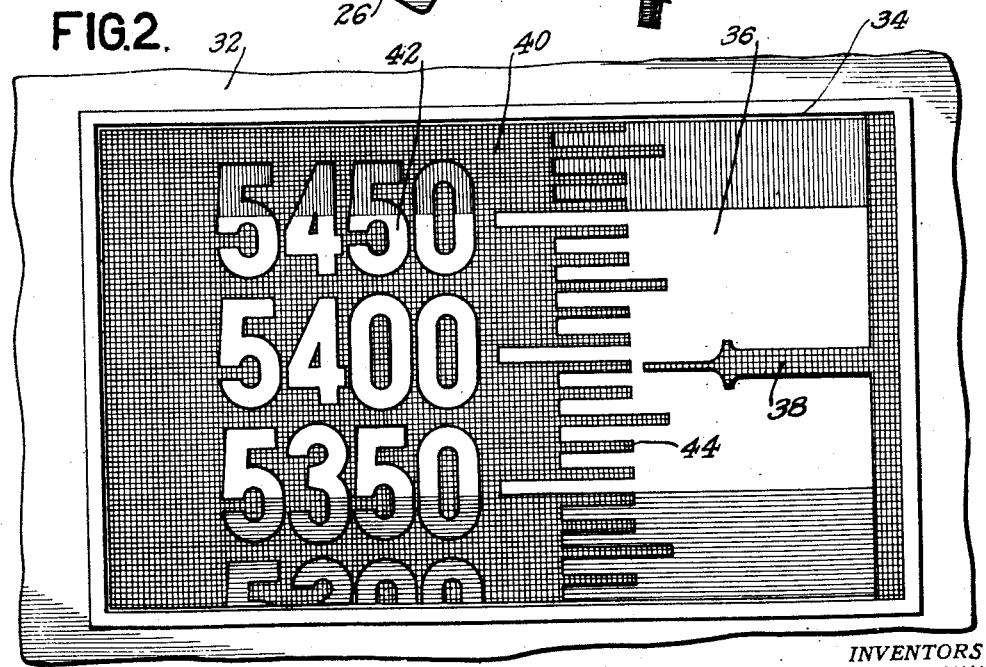
Figure 2 is a view showing the transparent screen covering a window in the scale housing on which an image of the pertinent part of the chart is thrown.

The scale mechanism is maintained within a housing 32, Figure 2, the front wall of which is provided with a window 34 having a translucent closure 36 on which is indicated, or in association with which there is, a pointer or hand 38 indicating the weight when the scale is in balance. The image of the illuminated chart is shown upon the screen 36 within the window and provides an opaque band 40 in which the indicia 42, giving an indication of the weights recorded, are transparent and a graduated scale 44, the graduations of which represent the weight according to the indicia and fractions thereof.

The instrumentalities by which the indicia depicted on the transparent chart are thrown upon the screen are illustrated diagrammatically in Figure 3, like reference characters being affixed to corresponding parts. Light from a light source 46 passes through the chart, is magnified by the magnifying lens system 47 and is reflected by mirrors 48 or the equivalent to the screen 36. All of the structure so described is contained within the housing 32 and is therefore inaccessible to the operator and cannot be tampered with.

In some situations in weighing each load of a constant weight and particularly where certain tolerances both above and below the specified weight are permitted, it is desirable to discover at a glance when the desired weight is indicated by the pointer or hand and also to provide an indication of the tolerances permitted above and below such weight. At the same time for facility in weighing, a certain portion of the scale should also be visible on opposite sides of the tolerances but so represented as to indicate that the tolerance is being approached or that the permissive tolerance above the prescribed weight indication has been passed. Such ready reading warning weight indications may be afforded in multi-color and may be indicated by a mask of one color so disposed as to afford a color over that portion of the scale before the tolerance is reached and a coloration representing a predetermined area after the tolerance is exceeded.

Such indications may of course vary in accordance with tolerance permitted in the weight of the article or material to be weighed and it is desirable therefore in the interest of both accuracy and facility in use to mount the color affording instrumentalities on the chart in an adjustable manner. In the embodiment illustrated in Figure 1, the quadrant 25 carries a quadrant-shaped frame 50 provided with a quadrant-shaped aperture 52 through which indicia 42 on the transparent chart are made visible by the light passing therethrough. Such a frame 50 may be adjustably mounted on the chart, for instance, by forming arcuate slots 54 on the respective sides of the frame through which pass clamp screws to lock the chart in a selected position. Obviously the quadrant frame 25 may be provided with a plurality of apertures to receive the adjusting screws at any position and permit the chart to be adjusted to any indicia on the scale. Such apertures may be provided by removing the screws 30 from any pair of holes or additional holes may be tapped in the frame. A mask is shown as formed of a transparent colored portion 56, for instance red, along the lower side of the opening 52 and a transparent portion 57 colored, for instance, blue, on the upper side of the opening while the space therebetween is uncolored to permit the white or relatively white chart image with its graduations in black or other contrasting color to appear therebetween. Thus the mask may be at any point along the graduations and the metal frame 50 of the mask first blacks out or renders invisible the illuminated chart image up to a desired graduation at which graduation a transparent color, for instance red, appears over the weight indications up to the point where the designated tolerance begins. The area representing the tolerance appears in white. When this tolerance is passed, the white indication is superseded by, say, the blue of the color mask, the blue color running to a designated graduation where it is again blacked out by the frame. Obviously, the frame portions at the ends of the frame 50 may be omitted if it is not found desirable or necessary to obscure any portion of the image of the illuminated chart.

The same principle of illuminated color weight indication may be availed of in batch weighing as, for instance, in situations in oil flow tests where specified intervals on the chart are covered with transparent colors, see Figure 4. Thus, instead of requiring the operator to follow the relative movement of the indicator and the actual figures on a graduated scale, by covering specified intervals with transparent colors, the operator can, by observing the color, tell at a glance when each batch has been delivered to the scale. Thus, in Figure 4, for instance, when the indicator 38 is observed to have travelled over say the blue area 60 and reaches the division line 62, the operator knows, say, that fifty pounds of oil has flowed from the container on the scale. Again when the indicator 38 passes through, say, the red area 64 and reaches the dividing line 66, an indication is given that a second fifty pound quantity of oil, or a total of one hundred pounds has left the container. A third fifty pound batch would be represented by the green area 68 and the coincidence of the indicator 38 and line 70 would indicate a total flow of one hundred fifty pounds. Obviously, as many colored transparent areas may be provided as is necessary for the purpose at hand as well as any combination of colors and dimensions of areas proportionate to the quantities to be weighed.

A variation in tolerance weighing by illuminated color weight indication is illustrated in Figure 5 in what may be termed color zoning. Here, the color zones do not extend transversely of the chart but in the longitudinal direction thereof because the zones to be considered overlap in weight indications. The zones are represented by the three elongated arcuate areas 74, 76, 78. Such an illuminated color chart, while possible of accomplishment with a removable frame such as indicated in Figures 1 and 4, is facilitated by the use of a full photographic transparency such as "Technicolor" or "Kodachrome" film. In such a situation, for illustrative purposes, a chart negative in black, such as that represented in Figure 2 with the appropriate zones, in desired color such as those shown at 74, 76 and 78 in Figure 5, may in one modification be developed on a single flexible full color photographic film which is then sandwiched between thin sheets of glass to form the chart 80.

It will thus be seen that a scale with a transparent chart has been provided on which or with which weight indications are provided together with a means for designating selected areas of weight indications for specific purposes to facilitate use of the scale and the reading of predetermined weights in their relation to a selected weight. By the use of colored areas through which light rays may be directed as well as through the transparent graduated chart, extreme accuracy and celerity of weighing is accomplished.

Various modifications may be made in the composition, disposition, configuration and manner of delineating selected areas of weight indications as well as in the manner of creating the illuminated-color weight-indications as well as in the type of metering device to which the invention is applied and no limitation is intended by the foregoing description or illustrations in the accompanying drawings except as indicated in the annexed claims.

What is claimed is:

1. In a weighing device of the type having a chart frame carrying a chart on which a graduated scale of weight indications is delineated by relatively transparent and opaque portions, said frame being movable in proportion to the load on said device so as to move said scale between a light source and a lens system by means of which that part of said scale adjacent the optical axis of said system is projected upon a viewing screen whereon the weight may be read with reference to a fixed index, the combination with said scale of transparent color screens having a predetermined relation to certain portions of said scale, said color screens being so positioned as to result in the projection on said viewing screen of a color identifying that portion of the scale image which is simultaneously projected thereon.

2. In a weighing device of the type having a chart frame carrying a chart on which a graduated scale of weight indications is delineated by relatively transparent and opaque portions, said frame being movable in proportion to the load on said device so as to move said scale between a light source and a lens system by means of which that part of said scale adjacent the optical axis of said system is projected upon a viewing screen whereon the weight may be read with reference to a fixed index, the combination with said chart frame of a support carrying spaced apart transparent color screens, and means for securing said support to said frame to position the color screens in superimposed relation to said scale in predetermined relation to a portion thereof, whereby the image of said portion on said viewing screen will appear as an uncolored area defined between two colored areas.

3. The device defined in claim 2 characterized by the fact that said spaced apart color screens are of two different colors whereby weight designations respectively over and under those included between said color screens may be distinguished on the viewing screen by color alone.

4. The device defined in claim 2 characterized by the fact that said means for securing said support to said frame is adapted to permit the securing of said support so as to position the color screens over any selected part of said scale.

5. In a weighing device of the type having a chart frame carrying a chart on which a graduated scale of weight indications is delineated by relatively transparent and opaque portions, said frame being movable in proportion to the load on said device so as to move said scale between a light source and a lens system by means of which that part of said scale adjacent the optical axis of said system is projected upon a viewing screen whereon the weight may be read with reference to a fixed index, the combination with said chart frame of a slotted support having an aperture, a plurality of transparent color screens disposed in said support so as to extend across said aperture, and fastening means coacting with the slots in said support and adapted adjustably to secure it to the chart frame so as to superimpose said color screens over predetermined portions of said scale.

6. In a weighing device of the type having a chart frame carrying a chart on which a graduated scale of weight indications is delineated by relatively transparent and opaque portions, said frame being movable in proportion to the load on said device so as to move said scale between a light source and a lens system by means of which that part of said scale adjacent the optical axis of said system is projected upon a viewing screen whereon the weight may be read with reference to a fixed index, the combination with said scale of two transparent color screens and means for adjustably mounting said color screens over selected portions of said scale in spaced relation to one another so as to define between them a scale segment of weight tolerances which will appear on said viewing screen as an uncolored segment between two colored segments.

7. In a weighing device of the type having a chart frame carrying a chart on which a graduated scale of weight indications is delineated by relatively transparent and opaque portions, said frame being movable in proportion to the load on said device so as to move said scale between a light source and a lens system by means of which that part of said scale adjacent the optical axis of said system is projected upon a viewing screen whereon the weight may be read with reference to a fixed index, the combination with said scale of a plurality of adjoining transparent color screens of different colors having their common margins extending across said scale so as sharply to delineate a plurality of weight ranges, and means for supporting said color screens in superimposed relation to said scale.

8. In a weighing device of the type having a chart frame carrying a chart on which a graduated scale of weight indications is delineated by relatively transparent and opaque portions, said frame being movable in proportion to the load on said device so as to move said scale between a light source and a lens system by means of which that part of said scale adjacent the optical axis of said system is projected upon a viewing screen whereon the weight may be read with reference to a fixed index, the combination with said scale of a plurality of transparent color screens extending longitudinally of said scale, said screens being of distinguishing colors and placed with reference to predetermined segments of the scale which overlap, said screens being staggered laterally so as not to overlap.

9. In a weighing device of the type having a chart frame carrying a chart on which a graduated scale of weight indications is delineated by relatively transparent and opaque portions, said frame being movable in proportion to the load on said device so as to move said scale between a light source and a lens system by means of which that part of said scale adjacent the optical axis of said system is projected upon a viewing screen whereon the weight may be read with reference to a fixed index, the combination with said chart frame of a support having an aperture so placed as to provide opaque masking portions at either end thereof, transparent color screens positioned across at least part of said aperture, and means to secure said support on said chart frame so as to mask parts of said scale and cover adjacent parts thereof with said color screens.

EDWARD VICTOR SYRCHER.
GEORGE BRUCE McNAIR.
WALTER WILBURN CRUMP.

Certificate of Correction

Patent No. 2,394,820.     February 12, 1946.

EDWARD VICTOR SYRCHER ET AL.

It is hereby certified that errors appear in the printed specification of the above numbered patent requiring correction as follows: Page 1, first column, line 55, for "weigh" read *weight*; page 3, first column, line 26, after the word "full" insert *color*; and that the said Letters Patent should be read with these corrections therein that the same may conform to the record of the case in the Patent Office.

Signed and sealed this 23d day of April, A. D. 1946.

[SEAL]

LESLIE FRAZER,
*First Assistant Commissioner of Patents.*